W. J. WEBSTER & R. NOALL.
SPRING TRAP.
APPLICATION FILED JAN. 18, 1911.
1,017,123.
Patented Feb. 13, 1912.
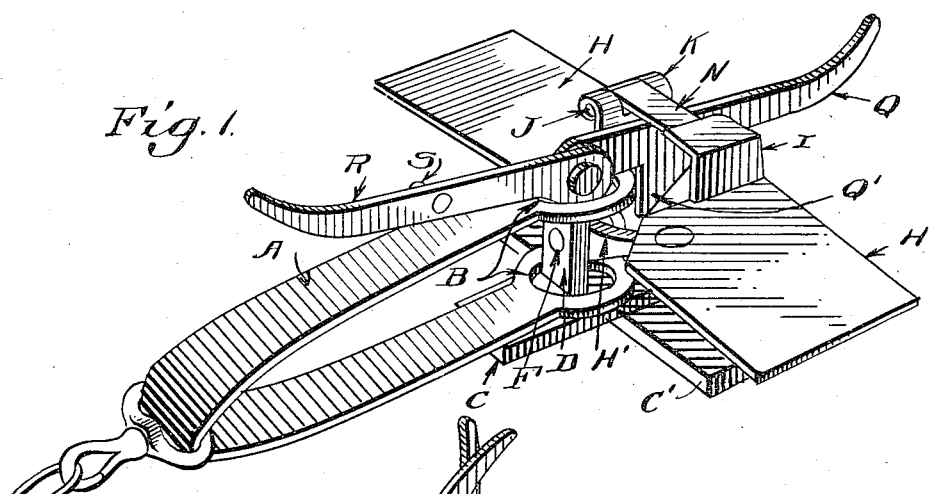
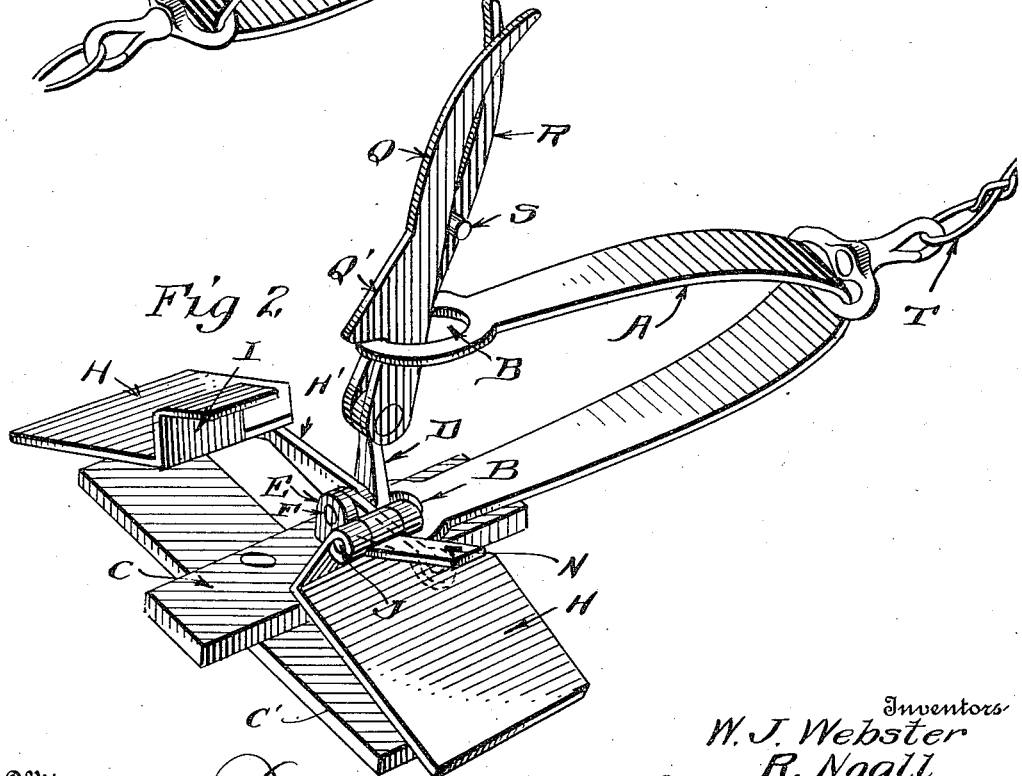
Inventors
W. J. Webster
R. Noall.

UNITED STATES PATENT OFFICE.

WILLIAM JAMES WEBSTER AND RICHARD NOALL, OF BISBEE, ARIZONA TERRITORY.

SPRING-TRAP.

1,017,123.  Specification of Letters Patent.  Patented Feb. 13, 1912.

Application filed January 18, 1911. Serial No. 603,363.

*To all whom it may concern:*

Be it known that we, WILLIAM J. WEBSTER and RICHARD NOALL, citizens of the United States, residing at Bisbee, in the county of Cochise and Territory of Arizona, have invented certain new and useful Improvements in Spring-Traps; and we do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in spring jaw traps and the object in view is to produce a simple and efficient device of this nature having various details of construction and combinations and arrangements of parts which will be hereinafter fully described and then specifically defined in the appended claims.

We illustrate our invention in the accompanying drawings, in which:—

Figure 1 is a perspective view showing our improved trap set, and Fig. 2 is a similar view showing it sprung.

Reference now being had to the details of the drawings by letter, A designates a bowed spring commonly employed in traps of this style and provided with apertures B, B at its ends.

C designates a bar supported upon the base C' which has lugs D and E projecting therefrom and each of which is apertured for the reception of a pivotal pin F, and H, H designate two tread members, each having a shank portion H' which is apertured and pivotally mounted upon said pivotal pin. Rising from one of the tread members is a flange I, and K designates a slotted flange upon the other of the tread members carrying a pivotal pin J upon which a pawl N is journaled which is adapted to engage underneath the laterally extending portion of the flange I to hold the trap set in the manner shown in Fig. 1 of the drawings.

Pivotally mounted upon a pin O which is carried by the lug D are the two jaws Q and R, the former of which is provided with a lateral projection Q' and the ends of said jaws are curved and pointed as shown. A stop S projects from one jaw and serves as a stop against which the rear edge of the other jaw is adapted to contact, as shown in Fig. 2 of the drawings. The shank portions of the jaws pass through one of the apertures of the spring, as shown, and the latter is adapted to contact with said projection Q' to limit the outer throw of one arm of the spring.

A suitable chain or other anchorage means, designated by letter T, is fastened to one end of the spring and its other end may be secured to any object.

In setting the trap, the arms of the bowed spring are pushed together, putting the spring under tension, the two jaws swinging down to the position shown in Fig. 1 and the pawl or tongue engaged under the flange I, one of the jaws bearing frictionally against the under side of the pawl and holding the flange I. When a sufficient weight comes upon either of the tread members H, one or the other thereof will be tilted, allowing the tongue to be withdrawn from the flange I and the spring will throw the jaws forcibly toward each other and impale the animal springing the trap.

What we claim to be new is:—

1. A spring trap comprising two pivotally mounted tread members, one having a flange and the other carrying a pivotal tongue engaging said flange, a bowed spring, pivotally mounted jaws, one of which is adapted to bear against the under surface of said tongue to hold the trap set and held by the tension of the spring.

2. A spring trap comprising a bowed spring with apertures in the end, a bar having lugs projecting therefrom, one of which extends through an aperture in the spring, tread members pivotally mounted between said lugs, one of the members having a flange and the other a pivoted tongue engaging said flange, and jaws pivotally mounted upon one of said lugs and bearing against the under surface of the tongue.

3. A spring trap comprising a bowed spring with apertures in the end, a bar having lugs projecting therefrom, one of which extends through an aperture in the spring, tread members pivotally mounted between said lugs, one of the members having a flange and the other a pivoted tongue engaging said flange, jaws pivotally mounted upon one of said lugs, a stop upon one jaw against which the other is adapted to contact, a lateral projection upon one jaw against which the marginal edge of the aperture in one end of the spring is adapted to contact to limit the upper throw of the spring.

In testimony whereof we hereunto affix our signatures in the presence of two witnesses.

WILLIAM JAMES WEBSTER.
RICHARD NOALL.

Witnesses:
  ROY TRATTON,
  WILLIAM JOHN REED.